(12) United States Patent
Luik

(10) Patent No.: US 8,534,963 B2
(45) Date of Patent: Sep. 17, 2013

(54) TOOL FOR MACHINING A WORKPIECE

(75) Inventor: Matthias Luik, Reutlingen (DE)

(73) Assignee: Hartmetall-Werkzeugfabrik Paul Horn GmbH, Tuebingen (DE)

( * ) Notice: Subject to any disclaimer, the term of this patent is extended or adjusted under 35 U.S.C. 154(b) by 207 days.

(21) Appl. No.: 13/015,133

(22) Filed: Jan. 27, 2011

(65) Prior Publication Data

US 2011/0123282 A1 May 26, 2011

Related U.S. Application Data

(63) Continuation of application No. PCT/EP2009/005007, filed on Jul. 10, 2009.

(30) Foreign Application Priority Data

Jul. 30, 2008 (DE) .......................... 10 2008 036 562

(51) Int. Cl.
*B23C 5/22* (2006.01)

(52) U.S. Cl.
USPC .................. 407/102; 407/34; 407/40; 279/83

(58) Field of Classification Search
USPC ....... 407/102, 34, 99, 101, 120, 106; 279/76, 279/83, 85, 86; 403/397.9, 379.4, 362
See application file for complete search history.

(56) References Cited

U.S. PATENT DOCUMENTS

| | | | | |
|---|---|---|---|---|
| 156,796 | A * | 11/1874 | Johnston | 279/90 |
| 997,568 | A * | 7/1911 | Lindgreen | 407/9 |
| 1,112,348 | A * | 9/1914 | Barnes | 279/74 |
| 1,522,587 | A * | 1/1925 | Hallstrom | 407/101 |
| 1,596,708 | A * | 8/1926 | Hubbard | 81/124.6 |
| 1,783,541 | A * | 12/1930 | Hogg et al. | 279/77 |
| 1,958,817 | A * | 5/1934 | Gase | 279/83 |
| 2,167,014 | A * | 7/1939 | Verderber | 279/83 |
| 2,359,286 | A * | 10/1944 | Billger | 279/51 |
| 2,432,860 | A * | 12/1947 | Clatfelter | 279/54 |
| 2,475,041 | A * | 7/1949 | Mattson | 173/132 |
| 2,524,707 | A * | 10/1950 | Koeln | 175/299 |
| 2,694,321 | A * | 11/1954 | Riza | 408/154 |
| 2,711,107 | A * | 6/1955 | Bjorn | 408/150 |
| 2,960,343 | A * | 11/1960 | Elledge | 279/81 |
| 3,289,678 | A * | 12/1966 | Fassbender | 131/198.2 |
| 3,410,160 | A * | 11/1968 | Le Barre | 408/153 |
| 3,507,508 | A * | 4/1970 | Andrews | 279/83 |

(Continued)

FOREIGN PATENT DOCUMENTS

| DE | 199 45 360 A1 | 3/2001 |
|---|---|---|
| DE | 199 56 592 A1 | 6/2001 |

(Continued)

*Primary Examiner* — Andrea Wellington
*Assistant Examiner* — Sara Addisu
(74) *Attorney, Agent, or Firm* — Saliwanchik, Lloyd & Eisenschenk

(57) ABSTRACT

The invention relates to a tool for machining a workpiece, incorporating a holder having a locating opening arranged at the end face and a cutting head having at least one cutting element arranged on the workpiece-side end. Furthermore, the tool has a sleeve which is made substantially of carbide and which, with a first, holder-side end, is inserted in an accurately fitting manner into the locating opening of the holder, and the cutting head is arranged in or on the second, cutting-head-side end of said sleeve, and coupling means for coupling the holder, cutting head and sleeve.

19 Claims, 14 Drawing Sheets

(56) References Cited

U.S. PATENT DOCUMENTS

| | | | |
|---|---|---|---|
| 3,557,419 A * | 1/1971 | Flannery | 407/36 |
| 3,576,076 A * | 4/1971 | Weissman | 433/165 |
| 3,672,692 A | 6/1972 | Fauth | 279/82 |
| 4,575,292 A * | 3/1986 | Pape et al. | 409/234 |
| 4,647,052 A * | 3/1987 | Butikofer | 279/83 |
| 4,648,763 A * | 3/1987 | Safranek | 409/234 |
| 4,813,831 A * | 3/1989 | Reinauer | 409/232 |
| 4,877,360 A * | 10/1989 | Pfalzgraf | 409/234 |
| 4,896,892 A * | 1/1990 | Andrews | 279/46.5 |
| 4,913,607 A * | 4/1990 | von Haas | 409/234 |
| 4,958,966 A * | 9/1990 | Andrews | 408/239 A |
| 4,995,768 A * | 2/1991 | Craft | 408/239 A |
| 5,040,932 A * | 8/1991 | Oshnock | 409/234 |
| 5,080,536 A * | 1/1992 | Andrews | 408/239 A |
| 5,098,293 A * | 3/1992 | Loof et al. | 433/165 |
| 5,261,302 A * | 11/1993 | Erickson et al. | 82/160 |
| 5,311,654 A * | 5/1994 | Cook | 29/447 |
| 5,417,131 A * | 5/1995 | Robertson | 82/158 |
| 5,468,102 A * | 11/1995 | Stojanovski | 409/234 |
| 5,478,175 A * | 12/1995 | Kraemer | 407/7 |
| 5,660,400 A * | 8/1997 | Kasmeier et al. | 279/83 |
| 5,873,682 A * | 2/1999 | Tripsa | 407/101 |
| 5,947,657 A * | 9/1999 | Lipohar et al. | 408/97 |
| 6,299,180 B1 * | 10/2001 | Satran et al. | 279/83 |
| 6,394,466 B1 * | 5/2002 | Matsumoto et al. | 279/103 |
| 6,503,027 B2 * | 1/2003 | Men | 407/33 |
| 6,517,296 B2 * | 2/2003 | Newmark | 408/82 |
| 6,543,318 B1 * | 4/2003 | Erickson | 82/1.11 |
| 6,929,426 B2 * | 8/2005 | Thiele et al. | 407/33 |
| 6,939,213 B2 * | 9/2005 | Lovchik et al. | 451/360 |
| 7,001,114 B2 * | 2/2006 | Blucher et al. | 407/103 |
| 7,112,020 B2 * | 9/2006 | Sheffler et al. | 409/234 |
| 7,165,923 B2 * | 1/2007 | Matsumoto et al. | 409/234 |
| 7,281,888 B1 * | 10/2007 | Kaiser et al. | 409/234 |
| 7,293,942 B2 * | 11/2007 | Travez et al. | 408/239 R |
| 7,435,042 B2 * | 10/2008 | White et al. | 408/127 |
| 7,520,704 B2 * | 4/2009 | Bae | 409/234 |
| 7,815,433 B2 * | 10/2010 | Bailey et al. | 433/129 |
| 7,896,589 B2 * | 3/2011 | Miller et al. | 408/226 |
| 8,118,312 B2 * | 2/2012 | Walters | 279/143 |
| 8,308,403 B2 * | 11/2012 | Hecht | 408/239 R |
| 2002/0009342 A1 * | 1/2002 | Vasudeva | 408/226 |
| 2002/0035902 A1 * | 3/2002 | Ericksson et al. | 82/158 |
| 2003/0210963 A1 * | 11/2003 | Kakai et al. | 408/231 |
| 2005/0186038 A1 * | 8/2005 | Thiele et al. | 407/102 |
| 2009/0035075 A1 * | 2/2009 | Hecht et al. | 407/104 |
| 2010/0303561 A1 * | 12/2010 | Fouquer | 407/102 |

FOREIGN PATENT DOCUMENTS

| | | |
|---|---|---|
| DE | 10 2008 015 673 A1 | 9/2008 |
| EP | 1 029 620 A2 | 2/2000 |
| WO | WO-02/76661 A1 | 3/2002 |

* cited by examiner

TOOL FOR MACHINING A WORKPIECE

CROSS-REFERENCE TO RELATED APPLICATIONS

This application is a Continuation application of International Patent Application PCT/EP2009/005007, filed Jul. 10, 2009, which claims the priority of German Patent Application 10 2008 036 562.9 filed Jul. 30, 2008.

BACKGROUND OF INVENTION

The present invention relates to a tool for machining a workpiece, incorporating a holder having a locating opening arranged at the end face, and incorporating a cutting head having at least one cutting element arranged on the workpiece-side end. In particular, the present invention relates to a ball race milling cutter.

During the milling of joint pins and hubs, special tools, what are referred to as ball race milling cutters, are usually used. These ball race milling cutters mill at the end face at various engagement depths and machining depths, for which purpose the ball race milling cutter is normally set at 20°. The races partly correspond to cylinder cutouts, but they are also partly curved, which necessitates very flexurally rigid tools. Milling is carried out in both soft and hardened materials. Depending on the intended application, various tool types are currently used. Such ball race milling cutters are described, for example, in DE 199 56 592 A1 and DE 199 45 360 A1.

In the known ball race milling cutters, usually a plurality of cutting elements, e.g. indexable cutting inserts, are arranged in corresponding recesses at the workpiece-side end of the holder (often also designated as parent body). For this purpose, the cutting elements have a central bore, through which the respective cutting element is screwed to the holder by means of a clamping screw. To this end, the holder has a corresponding tapped hole.

Irrespective of the fact that it is sometimes difficult, depending on the installation position of the tool in the corresponding machine tool, to exchange the individual cutting elements in the state in which they are still clamped in place in the machine tool, a bore running centrally through the cutting element also means, in principle, a reduction in the rigidity and strength of the cutting element. In addition, the length of the one or more cutting edges on the cutting element is limited toward the top as a result.

SUMMARY OF THE INVENTION

The object of the invention is to improve the tool described at the beginning for machining a workpiece to the effect that the one or more cutting edges on the at least one cutting element can have a greater length, wherein at the same time a simple exchange of the cutting element and/or of the cutting head is to be possible when the holder is clamped in place in the machine tool.

According to an aspect of the present invention, a tool is provided incorporating:
- a holder having a locating opening arranged at the end face,
- a cutting head having at least one cutting element arranged on the workpiece-side end,
- a sleeve which is made substantially of carbide and which, with a first, holder-side end, is inserted in an accurately fitting manner into the locating opening of the holder, and the cutting head is arranged in or on the second, cutting-head-side end of said sleeve, and coupling means for coupling the holder, cutting head and sleeve.

The invention is based on the idea of providing an interface between holder and cutting head, said interface having appropriate rigidity in order to absorb forces occurring during the machining, for example in order to absorb a bending stress, occurring in a ball race milling cutter on account of the angled setting, in order thus to ensure the requisite accuracy of the tool. According to the invention, a sleeve which is made of carbide and offers the requisite rigidity is therefore provided as part of this interface.

For reasons of ease of manufacture, the holder is preferably made of steel. Its large cross section provides for the rigidity at this location. The workpiece-side (top) part of the tool produces the ball race, the length being decisive. The "central part", that is to say the carbide sleeve, cannot be wider in cross section, because otherwise a collision will occur. Therefore a "tube", which should be as rigid as possible, is basically obtained in the central part. Here, therefore, recourse is had to carbide. The interface between carbide sleeve and cutting head is in turn preferably a combination of carbide (sleeve) and steel (part of the cutting insert). Steel is therefore preferably used at this location, because there has to be a very close fit here and plastic deformations can partly occur in the steel. If this location were also made of carbide, chipping could occur on account of the fit. However, the level of the steel in the cutting insert, to which the blade then belongs, is expediently kept as small as possible.

Due to this division, the holder can be reused if a defect occurs on the sleeve.

There is also the problem of the fastening. If the holder were made of carbide, neither shrink fitting nor pressing could be carried out. Other connections such as brazing are difficult to achieve. The same applies to the cutting head. Due to the steel insert, the cutting head is adapted very effectively to the respective task, whether by brazed-on individual blades or by a blade made entirely of carbide.

The at least one cutting element can in principle be attached to the cutting head in different ways. Furthermore, it is also possible in principle for indexable cutting inserts of known type to be used as cutting elements, that is to say indexable cutting inserts having a central bore through which a clamping screw screwed to the cutting head passes. However, this is not imperative in the configuration of the tool according to the invention. On the contrary, the cutting head can also be designed in one piece, on which one or more cutting elements, for example made of carbide, are brazed in place. Furthermore, the entire cutting head can also be formed in one piece from carbide with corresponding blades or in two pieces with a parent body (preferably not made of carbide) and an interchangeable head (made entirely or at least partly of carbide) with one or more blades. Depending on the intended use, a configuration can then be selected in which a simpler exchange of the cutting head or of parts of the cutting head is possible when the holder is clamped in place in the machine tool.

It is therefore possible according to the invention to configure the tool in such a way that it can cut right up to the center of the tool. As a result, greater cutting depths are possible and the machining time is reduced. A hole located in the center of the cutting element for a clamping screw, as a result of which the blade length is reduced by the radius of the through-hole, is therefore not absolutely necessary according to the invention.

Said object is therefore completely achieved by such a tool.

Preferred configurations of the tool according to the invention are specified in the dependent claims.

In a preferred configuration, the sleeve is of tubular design and is inserted into the locating opening of the holder. The sleeve is in principle either pressed, shrink-fitted or adhesively bonded/brazed to the holder and cannot be readily detached. In one configuration, the sleeve is designed to be tubular and—in the longitudinal direction—relatively short, because bores for coupling means, e.g. a screw or pins, are technically very complicated to produce. For reasons of rigidity, the holder is then preferably designed to be somewhat thicker.

In a further configuration, the coupling means is designed for directly coupling the cutting head to the holder, and the sleeve is arranged in a clamped manner between the holder and the cutting head. To this end, the cutting head is preferably designed to be sufficiently large at its holder-side end and preferably extends into the locating opening of the holder in order to then be coupled there directly to the holder by means of the coupling means. The coupling means are in this case preferably designed in such a way that, in particular with a cutting head of one-piece design, the coupling means can be easily released for exchanging the cutting head.

In another advantageous development, the sleeve is fixedly inserted into the locating opening of the holder, in particular shrink-fitted into the locating opening. Such fixed insertion helps to increase the rigidity and thus the accuracy of the tool, since the sleeve in principle can no longer change its position relative to the holder during the machining.

Furthermore, provision is preferably made for the coupling means to be designed for directly coupling the cutting head to the sleeve. This configuration is especially advantageous when the sleeve is fixedly inserted into the locating opening. In this configuration, too, the coupling means are preferably designed in such a way that the cutting head can be exchanged if need be.

In further configurations, the cutting head has, at its holder-side end, an extension which projects through the sleeve right into the locating opening of the holder, in particular in order to then be directly coupled to the holder. In a practical configuration, provision is made for the holder to have a holder transverse bore which opens, at least on one side, into the locating opening, for the extension to have a cutting head transverse bore corresponding thereto, and for the coupling means to have a screw, in particular a taper screw, which leads into the cutting head transverse bore through the holder transverse bore. This configuration offers the advantage of relatively simple producibility at low costs.

In an alternative configuration, the holder has at least one, in particular two holder transverse bores which open into the locating opening, the extension has a circumferential groove corresponding thereto, and the coupling means have at least one, in particular two pins which engage in the groove through the holder transverse bore. This configuration also offers the advantage of low costs with improved handling compared with the configuration described above.

In alternative configurations, the cutting head has, on its holder-side end, an extension projecting right into the sleeve and having a cutting head transverse bore, the sleeve has a sleeve transverse bore corresponding thereto, and the coupling means have a pin leading into the sleeve transverse bore through the cutting head transverse bore. This configuration offers very good handling with good producibility and positioning accuracy, but requires increased production costs and offers a lower loading capacity.

Provision is also preferably made in this configuration for the holder-side end of the extension to be slotted and for the slot to be connected to the cutting head transverse bore, such that the cutting head can be slipped over the pin and fitted by rotation, that is to say brought into the working position. As a result, the cutting head can be coupled to the sleeve, or released again, in a simple manner virtually like a bayonet catch by slipping it on and rotating it.

In another development, the cutting head has, on its holder-side end, a thread accessible at the end face, the holder has a longitudinal bore running centrally through the holder, and the coupling means have a screw which runs through the longitudinal bore of the holder and through the sleeve and is arranged in a rotationally locked manner and to which the cutting head is screwed. This configuration offers very good positioning accuracy and loading capacity with ease of production and at a low cost. Due to the rotational locking of the screw, the cutting head can be exchanged in a simple manner without changing the position of the holder, that is to say also in the state inserted in the machine tool.

In a further configuration, the cutting head has, on its holder-side end, a thread accessible at the end face, the sleeve has a thread, corresponding thereto, at its cutting-head-side end, and the cutting head and the sleeve are screwed together. This configuration also offers good positioning accuracy and loading capacity, although it is more complicated in terms of production and involves higher costs.

In principle, the invention can be used in any tool types in which a cutting head having at least one cutting element sits at the end face on the holder. The invention is preferably used in a ball race milling cutter, in which the tool is therefore designed as a ball race milling tool. However, the invention can also be used advantageously in other milling tools or boring tools. The invention can be used in general for all types of bore machining, including, for example, reaming and internal turning, for which reason the type of coupling according to the invention can also be used for lathe tools.

It goes without saying that the abovementioned features and the features still to be explained below can be used not only in the respectively specified combinations but rather also in other combinations or on their own without departing from the scope of the present invention.

BRIEF DESCRIPTION OF DRAWINGS

The invention is explained in more detail below with reference to the exemplary embodiments shown in the drawings, in which.

DETAILED DISCLOSURE

Figure 1:
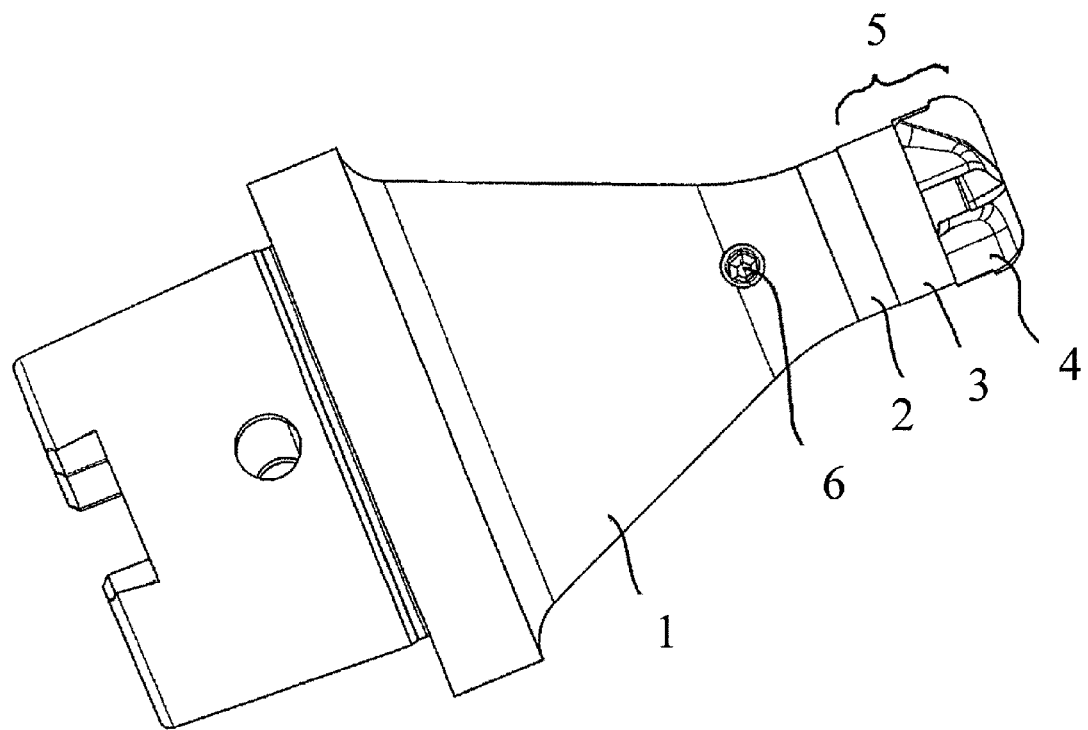
FIGS. 1, 2A, and 2B show a first embodiment of a tool according to the invention in the assembled and dismantled states, respectively.

FIGS. 1 and 2 show a first embodiment of a tool according to the invention in the assembled state (FIG. 1) and dismantled state (FIG. 2). The tool in this case is designed as a ball race milling cutter and comprises a holder 1, a sleeve 2 made of carbide, a two-piece cutting head 5, formed from a cutting head parent body 3 and a blade carrier 4, and a coupling means 6, which in this case is in the form of a taper screw. The shape and configuration of the holder 1 is known in principle and is not to be explained in any more detail at this point. However, it is essential for the invention that the holder has a central locating opening 11 at the end face on its workpiece-side end and that a holder transverse bore 12 runs transversely thereto through the front region of the holder 1 on the workpiece side. This holder transverse bore 12 runs into the holder 1 at least until it opens into the locating opening 11. Alternatively, the holder transverse bore 12 can also run completely through the cross section of the holder 1. For strength reasons, the screw 6 here runs completely through the holder and is screwed in at the opposite wall of the holder 1.

On its holder-side end, the cutting head parent body 3 has an elongated extension 31, the outside diameter of which is slightly smaller than the inside diameter of the locating opening 11. Furthermore, a cutting head transverse bore 32 runs transversely through this extension 31. The workpiece-side end 33 of the cutting head parent body 3 has an enlarged cross section relative to the extension 31 and merges into the extension 31 via a tapered transition surface 34. The workpiece-side end face 35 of the cutting head parent body 3 is flat, and the blade carrier 4 is arranged on this end face 35, for example brazed on or welded on. The position in which the outside diameter of the extension 31 bears against the inside diameter of the locating opening 11 is preferably reached either at the tapered transition surface 34 or, alternatively, at a cylindrical surface (not shown here).

The blade carrier 4 can in principle be formed in one piece and entirely of carbide and can have one or more cutting edges 41. However, the blade carrier 4 can also be formed mostly of steel with brazed-on carbide blades. Furthermore, it is also possible for interchangeable cutting inserts to be arranged on the blade carrier 4 in a known manner.

Figure 2A:
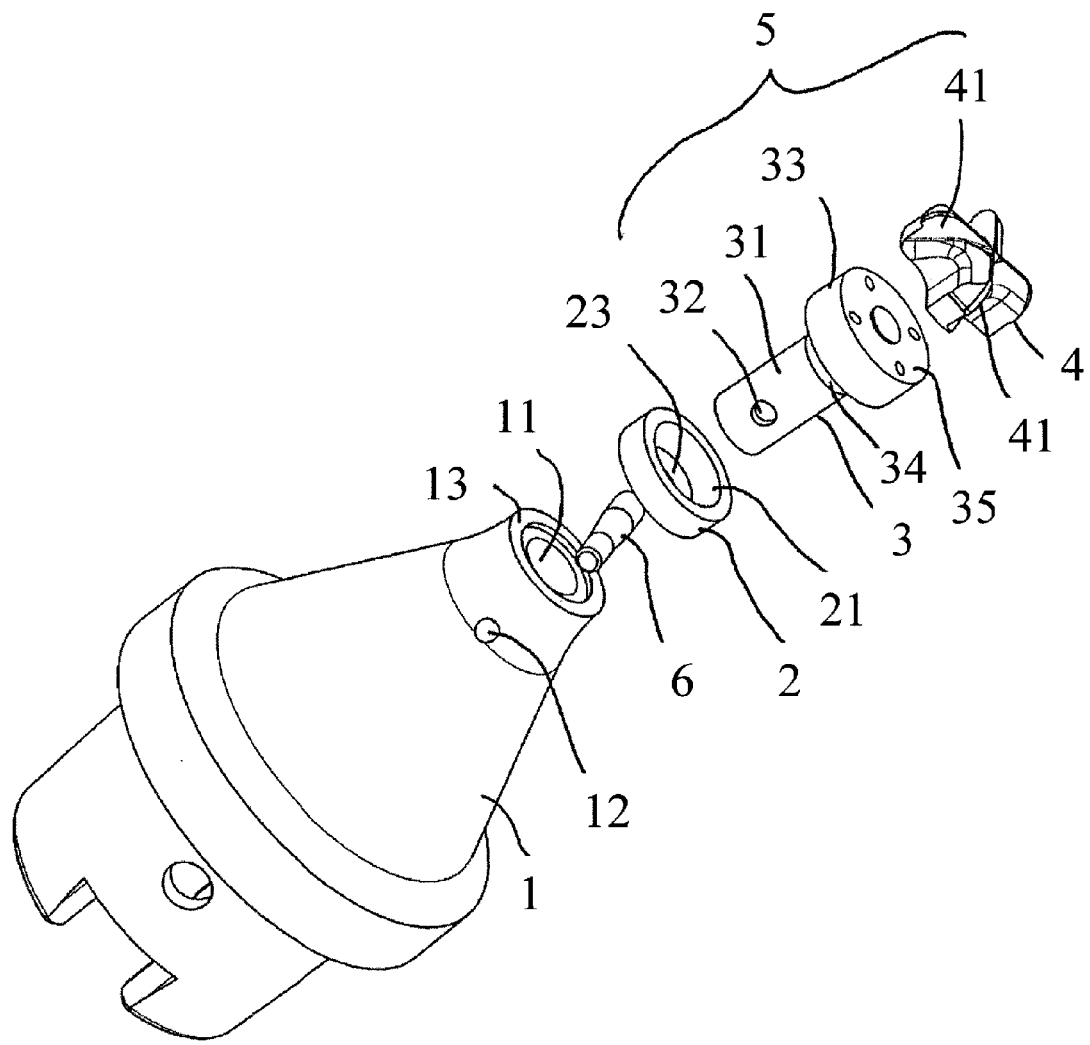
Figure 2B:
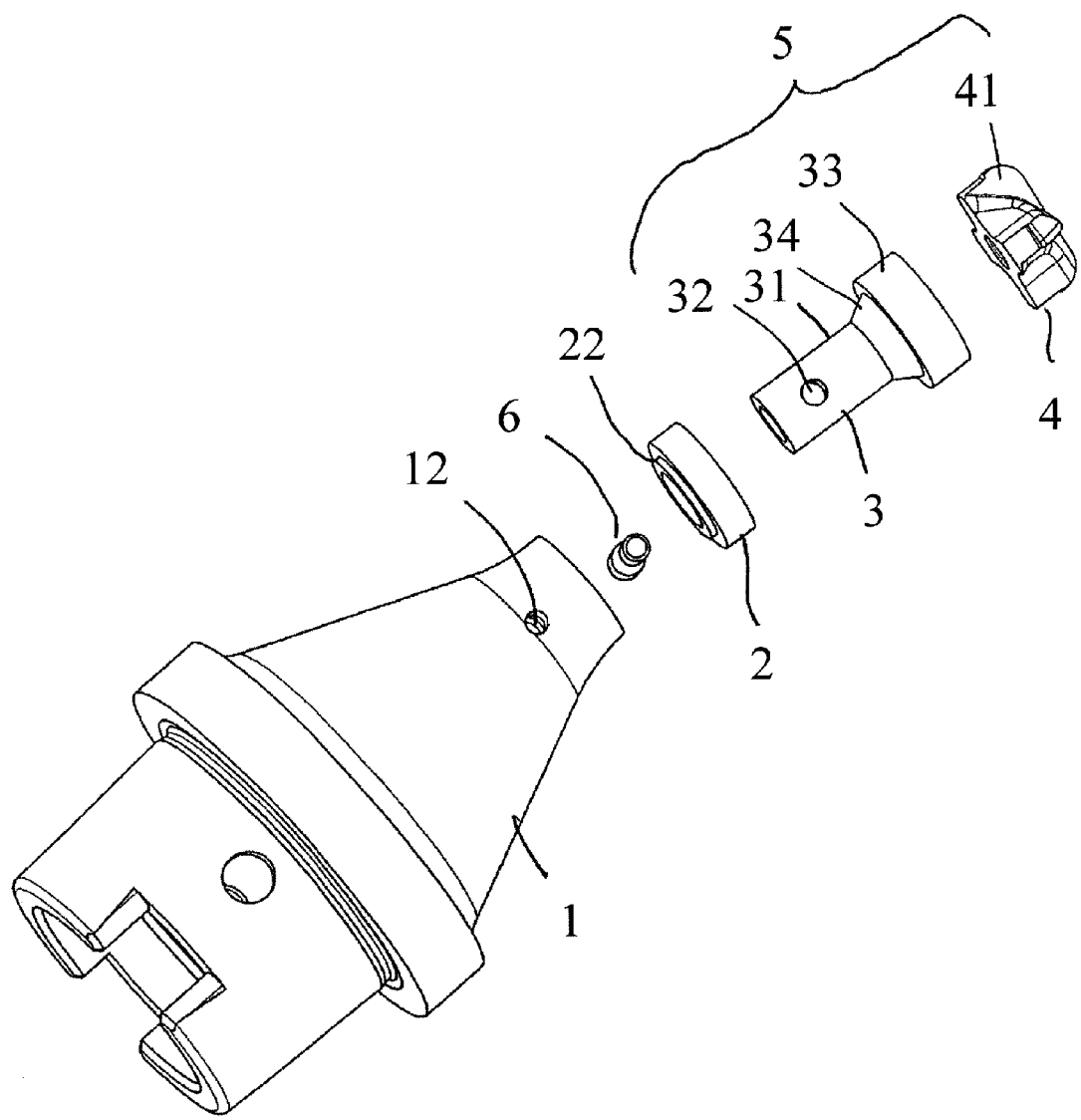

As can be seen in FIG. 2A, the sleeve 2 has a cross section 21 which narrows toward the holder 1 and which forms virtually an internal taper for accommodating the tapered transition surface 34 of the cutting head parent body 3. Furthermore, as can be seen in FIG. 2B, the sleeve 2 has an insert ring 22 on its holder-side end, said insert ring 22 having a smaller outside diameter than the rest of the sleeve 2 and being formed in such a way that it engages in the locating opening 11, while the rest of sleeve bears on the end-face margin 13 of the holder 1.

In the assembled state, the sleeve 2, partly inserted into the locating opening 11 of the holder, rests on the top margin 13 of the latter. The extension 31 of the cutting head parent body 3 projects through the central sleeve bore 23 of the sleeve 2 into the locating opening 11. The holder transverse bore 12 and the cutting head transverse bore 32 are arranged in such a way that they are in alignment in this state, such that taper screw 6 runs through both bores and is screwed into a thread arranged in the holder transverse bore 12 and/or the cutting head transverse bore 32. This state is shown in FIG. 1. To exchange the cutting head 5, the taper screw 6 is removed, for which purpose said taper screw 6 has, on an end face, an engagement means for a corresponding tool, e.g. a hexagon socket. The cutting head 5 can then be removed and a new cutting head inserted into the holder 1. This can be done while the holder 1 continues to be clamped in place in a corresponding machine tool.

Since the sleeve 2 is formed entirely of carbide, it provides the requisite rigidity during the machining, which can therefore be carried out with high precision.

Figure 3:
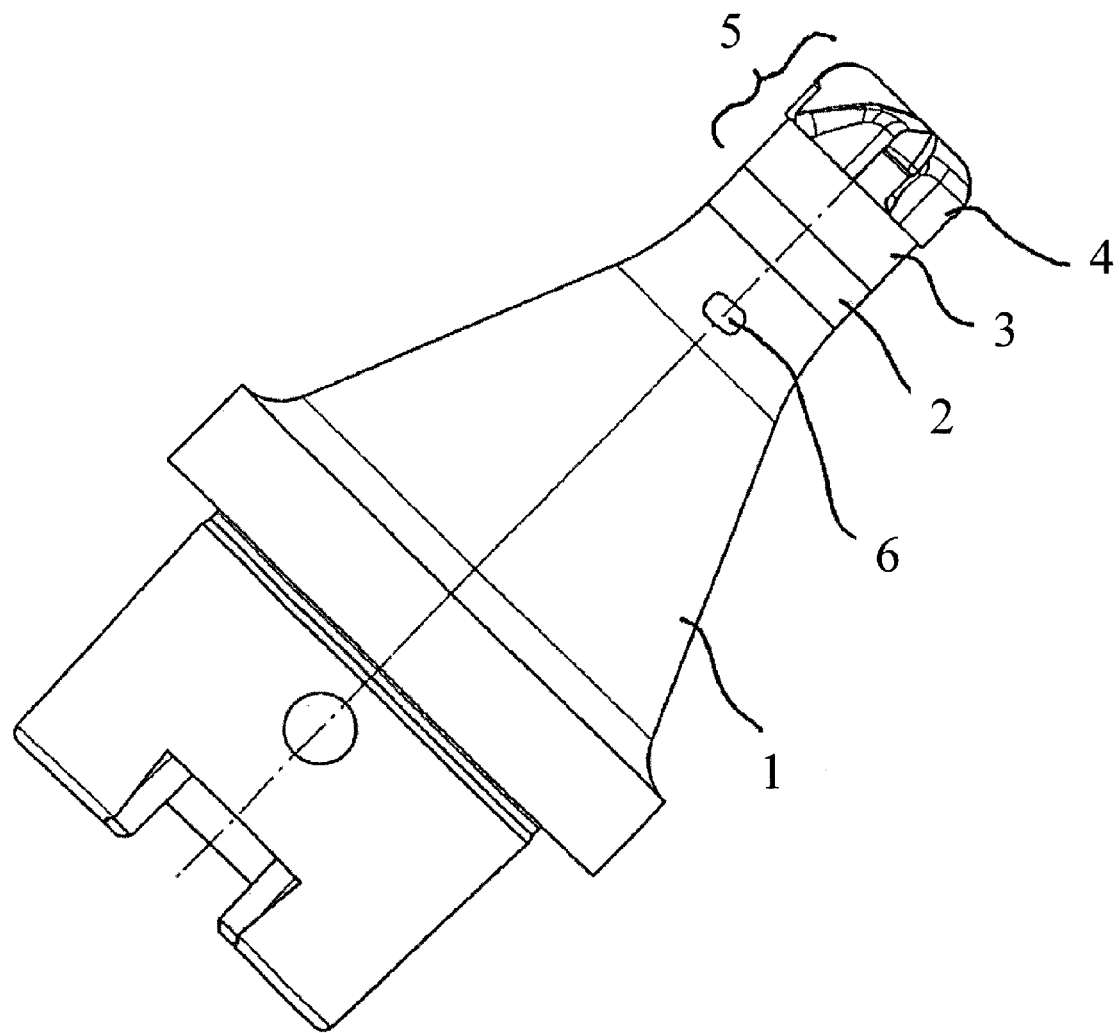
FIGS. 3, 4A, and 4B show a second embodiment of a tool according to the invention in the assembled and dismantled states, respectively.
Figure 4A:
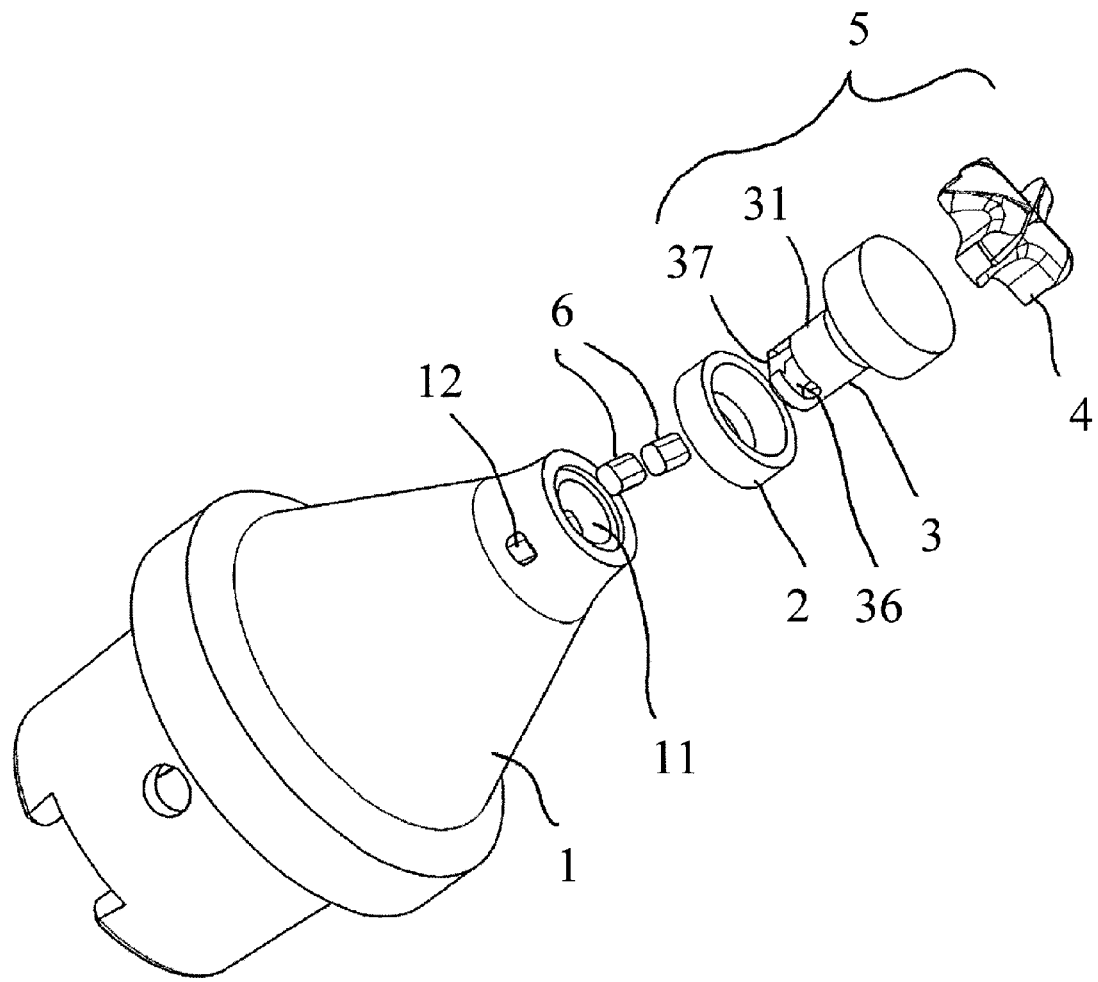
Figure 4B:
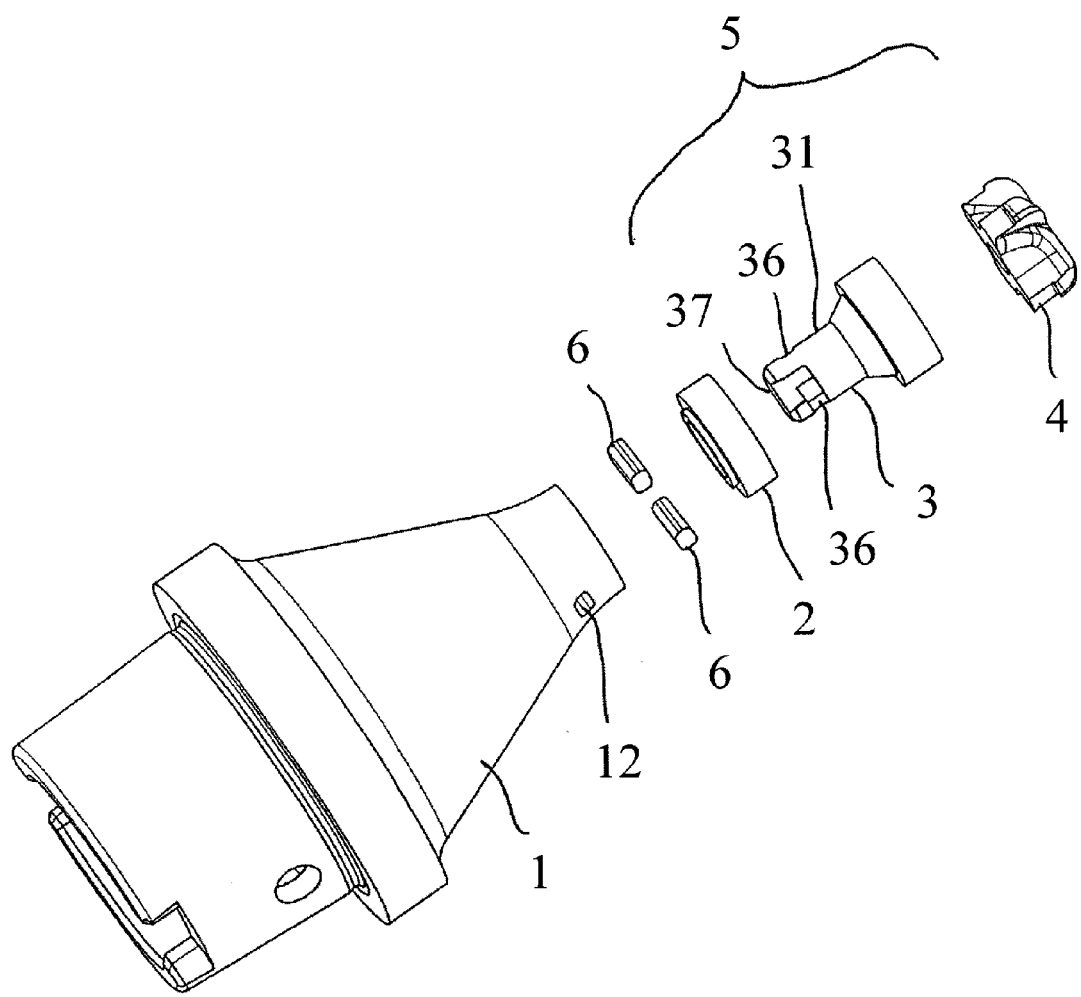

A second embodiment of a tool according to the invention is shown in FIGS. 3, 4A, and 4B. The basic construction and the functioning of the tool are the same as in the embodiment shown in FIG. 1, and so this is not to be explained in any more detail at this point. A holder transverse bore 12 is also provided in the holder 1 in this embodiment, said holder transverse bore 12, in contrast to the holder transverse bore 12 provided in the first embodiment, preferably having an elongated cross section for the insertion of corresponding pins 6 having a corresponding cross section.

The cutting head parent body 3 again has an extension 31, but annular grooves 36 at a distance from the holder side end face 37 now run on the holder-side end of said cutting head parent body 3, and these annular grooves 36 each bend at one location toward the holder-side end face 37.

To assemble the tool, first of all the pins 6 can be inserted into the holder transverse bore 12. The sleeve 2 is then inserted into the locating opening 11 and after that the cutting head 5 is inserted through the sleeve 2 into the locating opening 11, such that the ends of the pins 6 which project into the locating opening 11 pass over the angled part into that part of the annular groove 36 which runs all round. The cutting head 5 is then rotated about its longitudinal axis and thus sits tightly in the holder 1. To exchange the cutting head 5, these steps are carried out the other way round, it being possible for the pins 6 to remain seated in the holder transverse bore 12.

Figure 5:
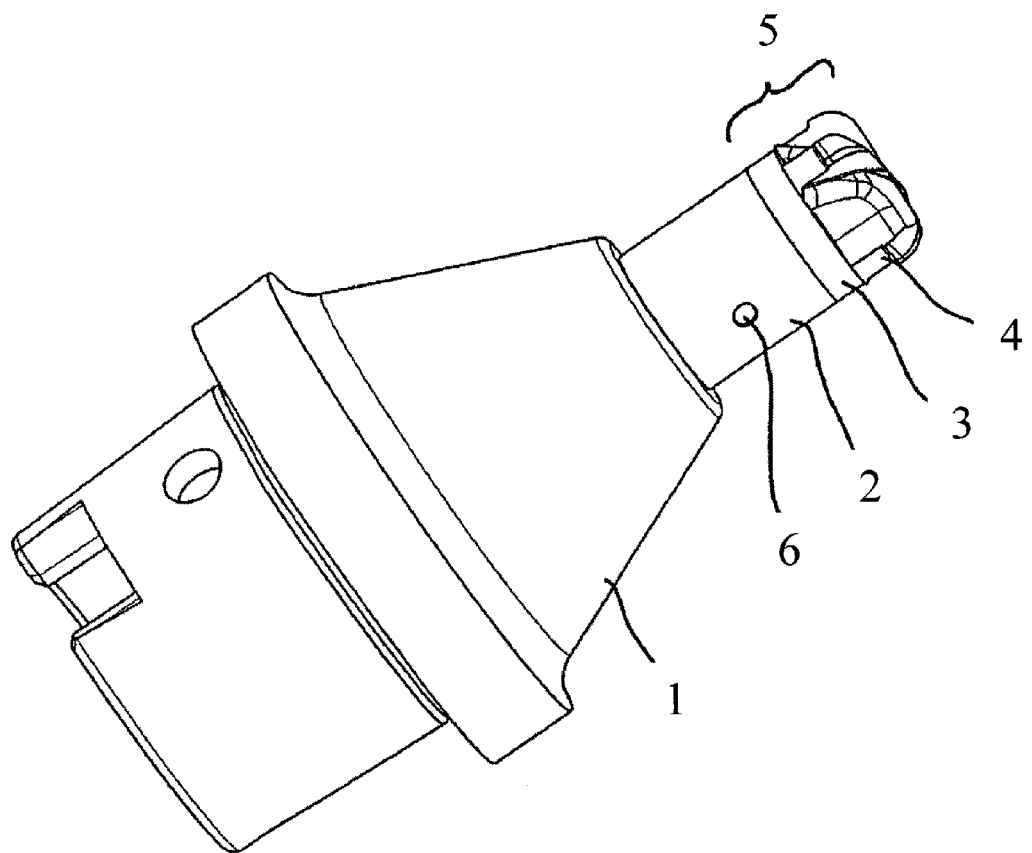
FIGS. 5, 6A, and 6B show a third embodiment of a tool according to the invention in the assembled and dismantled states, respectively.
Figure 6A:
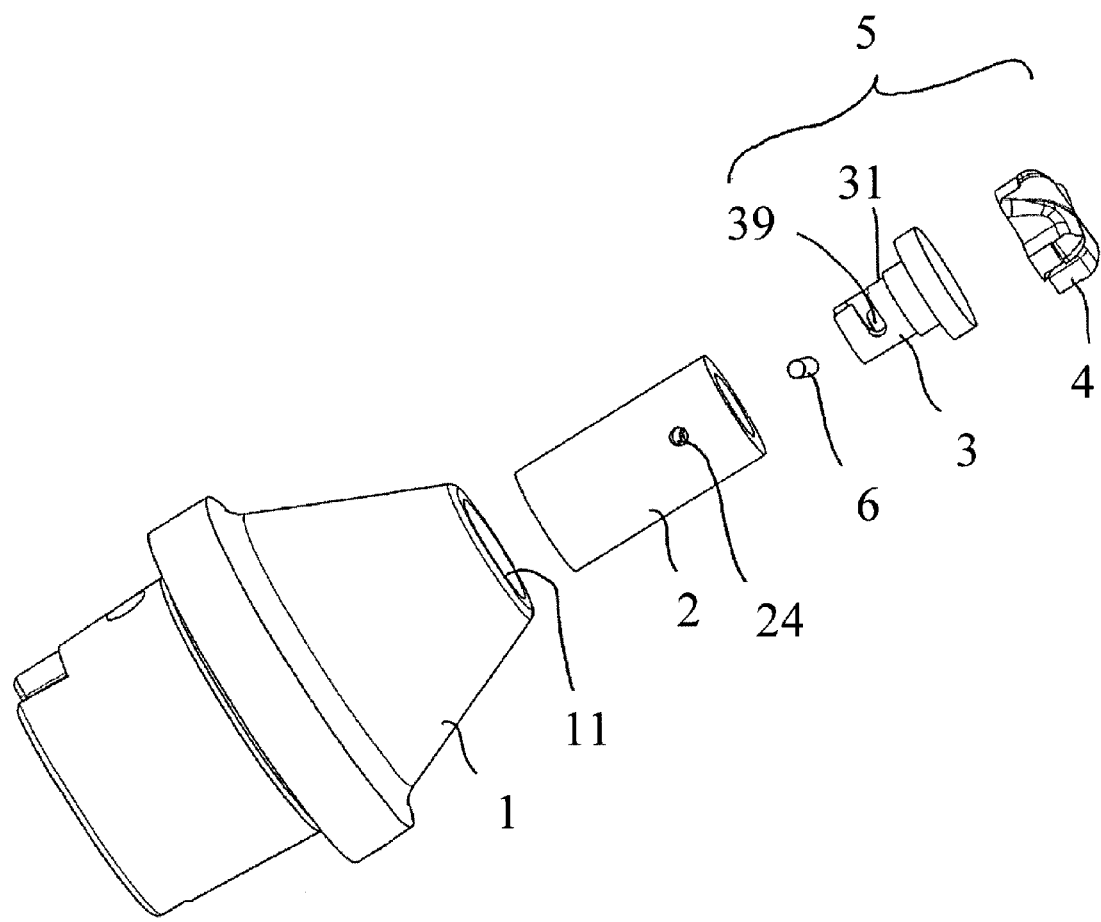
Figure 6B:
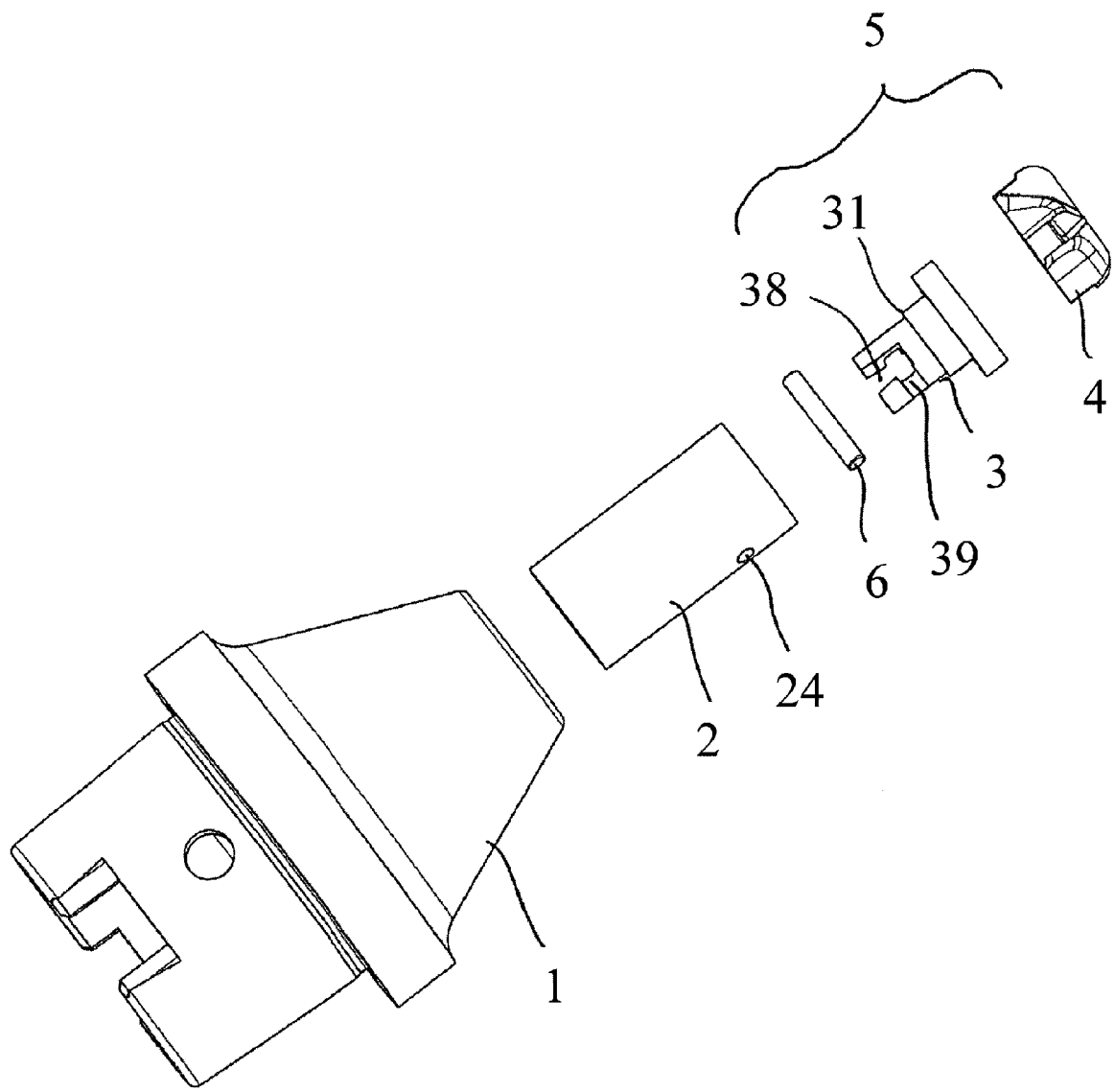

FIGS. 5, 6A, and 6B show a third embodiment of a tool according to the invention. Unlike in the first and second embodiments, the sleeve 2 in this embodiment is not configured as a narrow ring which sits only with a narrow end section 21 in the locating opening 11 of the holder 1, but rather is of tubular design and sits over most of its length, that is to say over about 25 to 50% of its length, inside the locating opening 11 of the holder. For example, the sleeve 2 can be brazed in place or shrink-fitted there. Furthermore, in this configuration, in the region of the workpiece-side end, that is to say the longitudinal section which does not sit in the locating opening 11 in the assembled state, the sleeve 2 has a sleeve transverse bore 24, the diameter of which is adapted to the outside diameter of the pin 6.

The cutting head parent body 3 is designed like a bayonet catch at its holder-side end and has an engagement means 38 which runs approximately over half the length of the extension 31 and merges into an annular groove 39 approximately in the center of the extension 31. As a result, the cutting head 5, during assembly, can be slipped over the transverse pin 6 sitting in the holder transverse bore 24 and can then be fastened thereto by rotation or released again in a corresponding manner.

Figure 7:
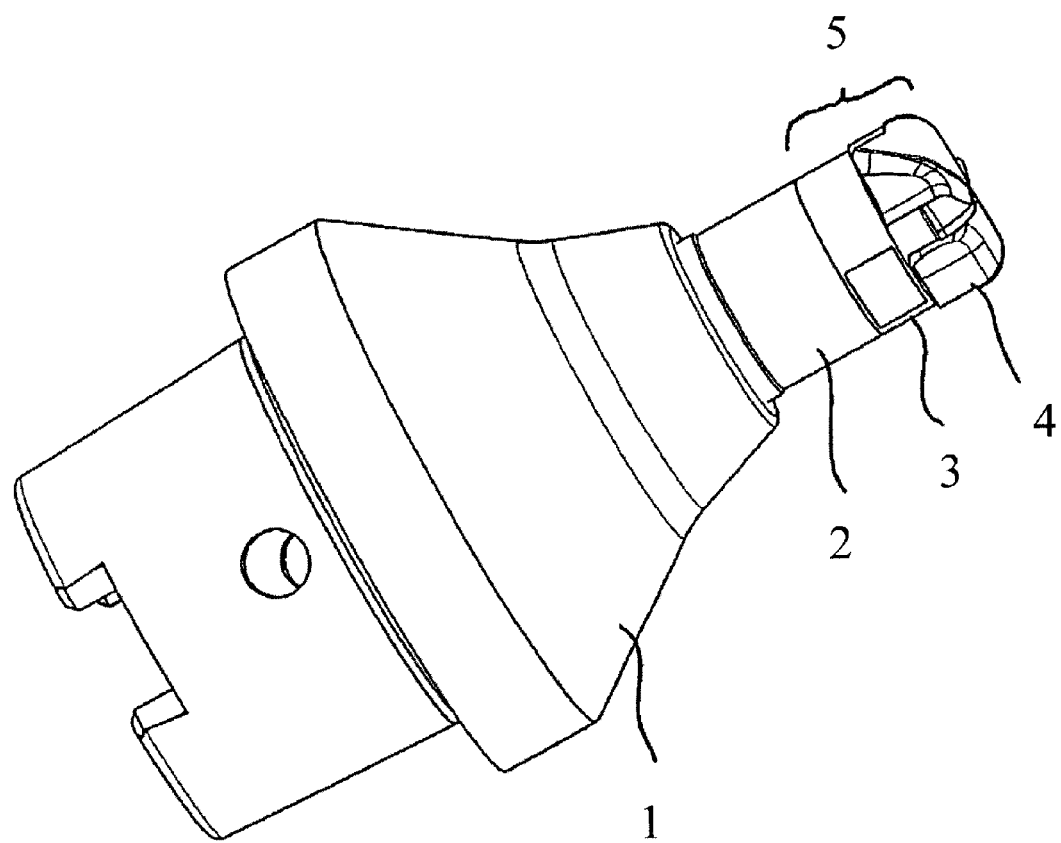
FIGS. 7, 8A, and 8B show a fourth embodiment of a tool according to the invention in the assembled and dismantled states, respectively.
Figure 8A:
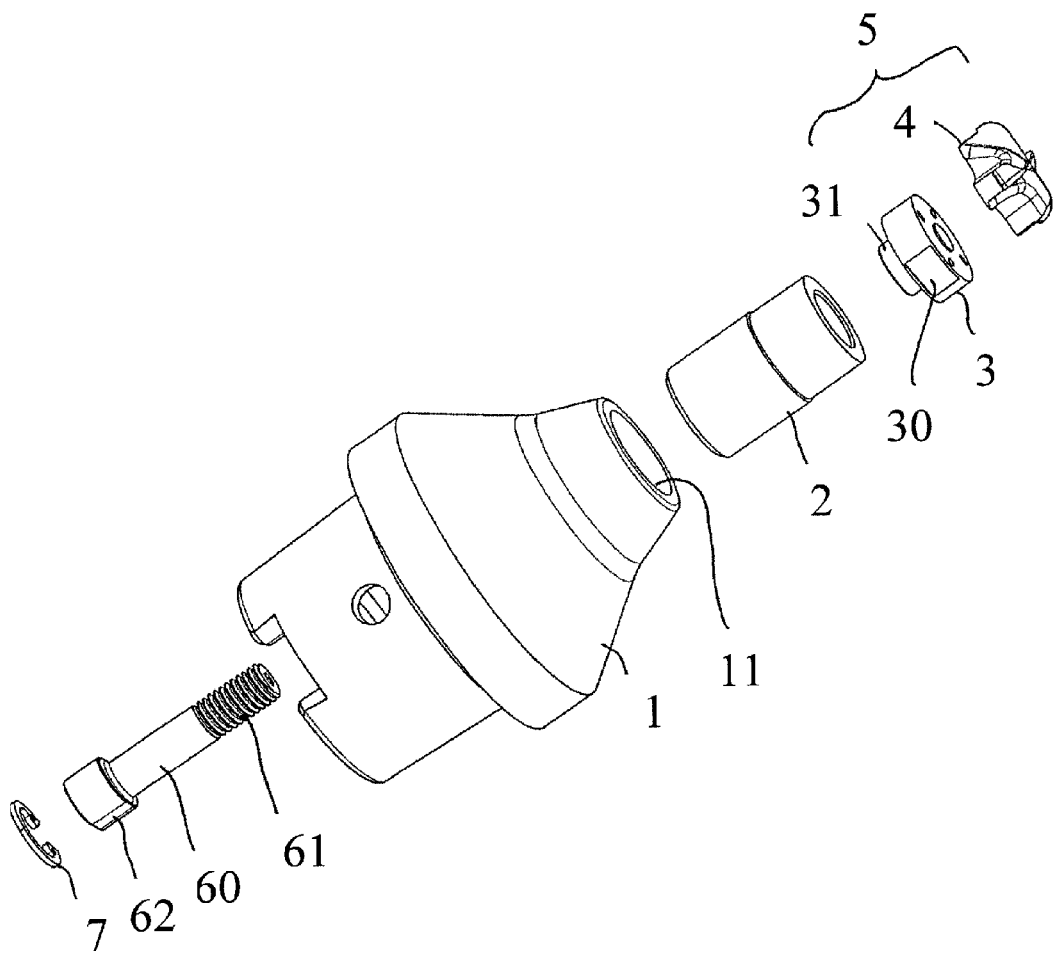
Figure 8B:
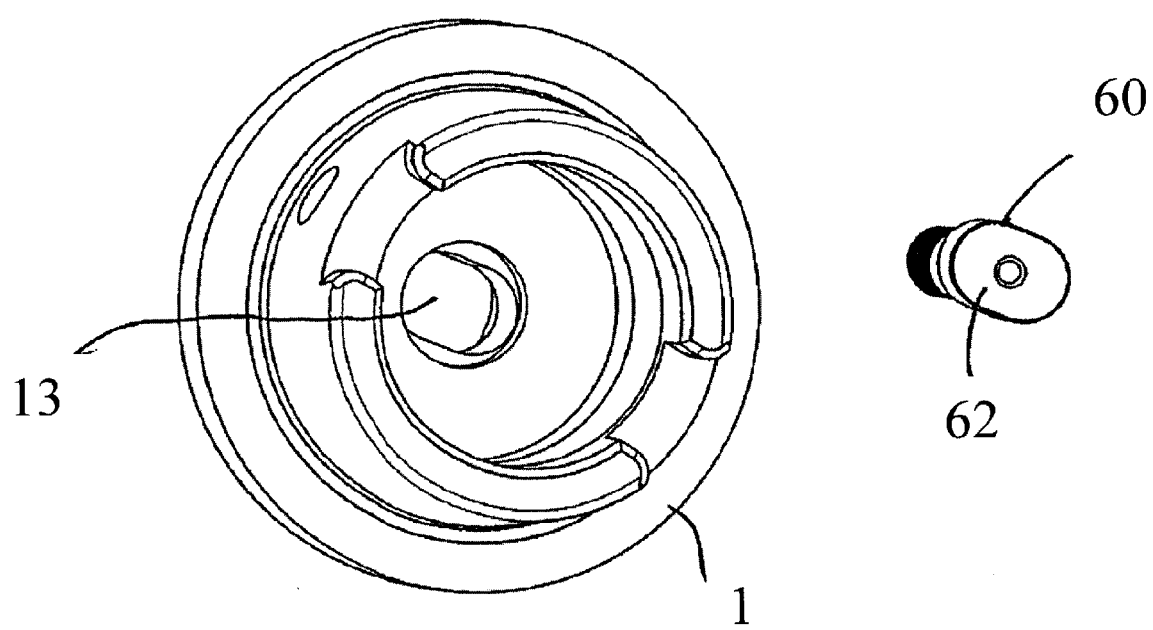

FIGS. 7, 8A, and 8B show a fourth embodiment of a tool according to the invention. As in the third embodiment, the sleeve 2 in this embodiment is of tubular design and sits mostly in the locating opening 11 of the holder 1. In this embodiment, however, the cutting head parent body 3 only has a short extension 31, which is provided with a thread, in this case an internal thread (although in principle an external thread is also possible).

In this embodiment, the coupling means have a long screw 60 which has a thread, in this case an external thread 61, corresponding to the thread of the extension 31. The head 62 of this screw 60 has a lateral flat and sits in the assembled state in a rotationally locked manner in a correspondingly shaped, rear through-hole 13 of the holder 1 and can be secured against falling out by means of a circlip 7. The cutting head 5 is screwed onto this screw, which projects through the entire holder 1 and mostly through the sleeve 2, for which purpose the cutting head parent body 3 has lateral, flat engagement surfaces 30 for a tool, e.g. an open-end wrench. The cutting head 5 can be exchanged especially easily in this way.

Figure 9:
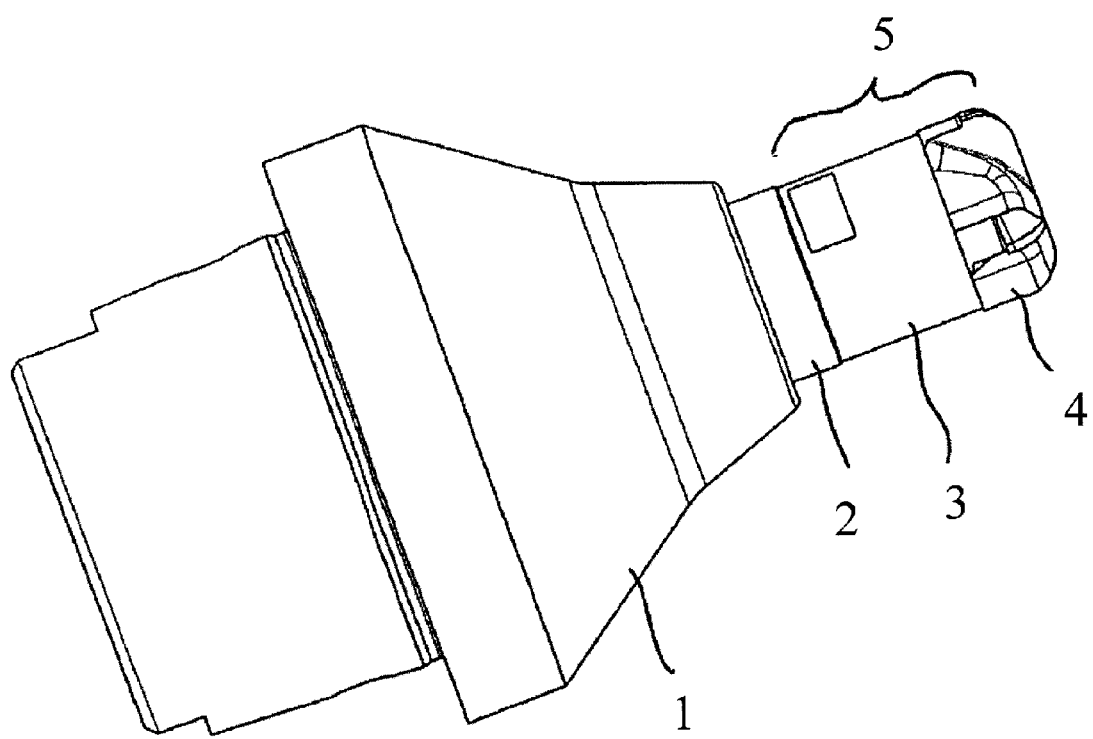
FIGS. 9 and 10 show a fifth embodiment of a tool according to the invention in the assembled and dismantled states, respectively.
Figure 10:
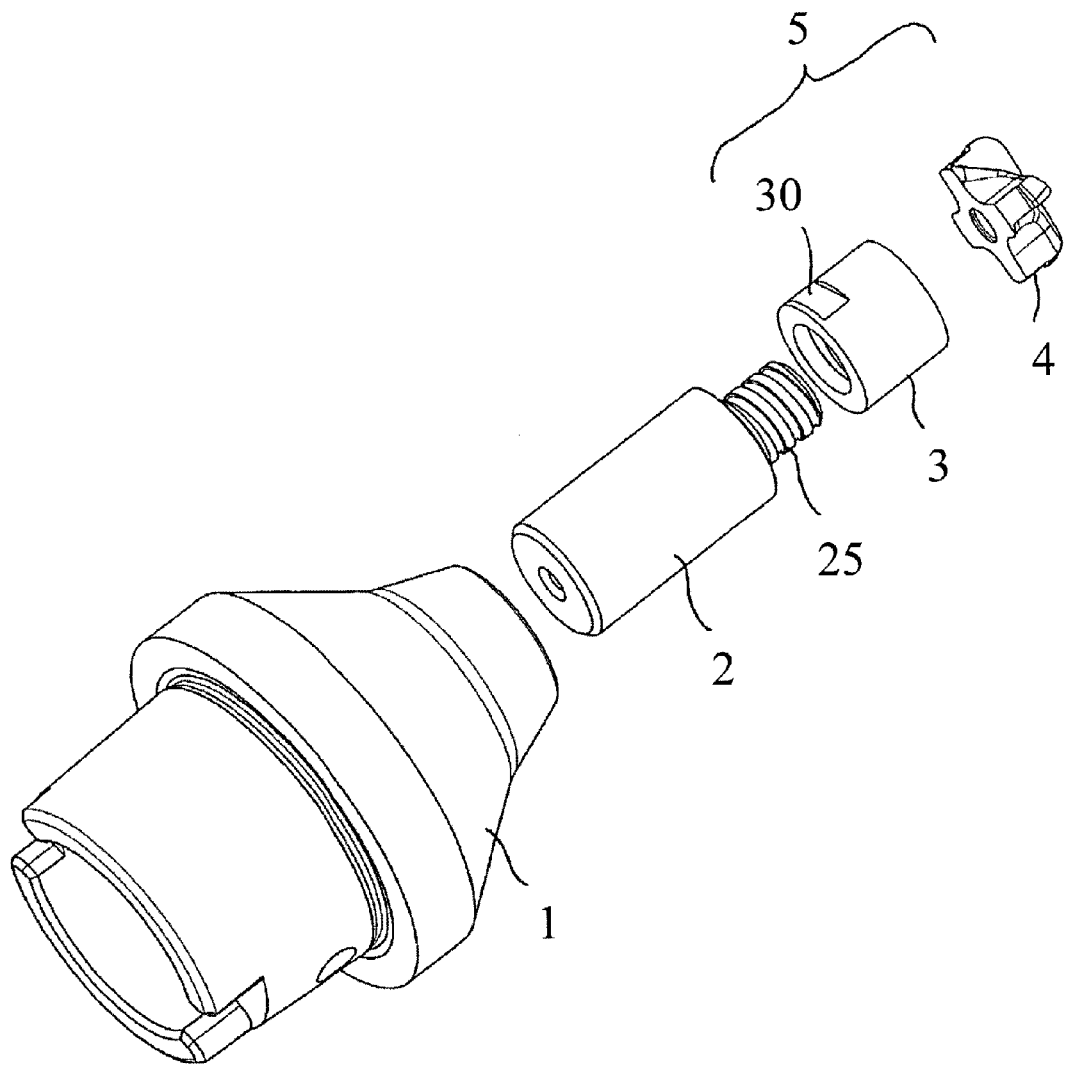

A fifth embodiment of a tool according to the invention is shown in FIGS. 9 and 10. In this embodiment, the sleeve 2 likewise sits mostly in the locating opening 11 of the holder 1 but does not need to have a longitudinal through-hole for the coupling (although in practice a longitudinal passage is nonetheless provided as coolant supply), but rather has an external thread 25 at its end face on the workpiece side, said external thread 25 constituting the coupling means and projecting completely from the holder 1 in the state in which the sleeve 2 is inserted in the holder 1. The cutting head parent body 3 has an internal thread corresponding thereto and is therefore screwed onto the external thread 25 of the sleeve 2 during assembly of the tool. In this embodiment, too, the cutting head 5 can therefore be changed in a simple manner.

It need only be mentioned in passing that the tools usually have a central longitudinal bore or small opening for a cooling medium (air, minimum quantity lubrication or emulsion). In the cutting head shown in the drawing, four smaller bores which direct the cooling medium to the blade branch off from this bore. In the fourth and fifth configurations, too, such a bore is located in the screw 60 or the sleeve 2.

The present invention therefore offers a means of interchangeably arranging a cutting head on a holder in a simple and cost-effective way, without the holder having to be unclamped from the machine tool. Owing to the fact that no fastening means are required in principle for fastening the cutting elements, for instance cutting inserts, to the cutting head, it is also possible to select as large a length of the cutting edges as possible, as a result of which improved application possibilities and a cost advantage for the end user can be achieved.

The invention also permits greater cutting depths and enables the cutting head to be exchanged in the state clamped in place in the machine. Furthermore, the blades or blade geometries can be easily varied in always the same holder. The tool according to the invention can be used in a versatile manner in turning, milling and all types of bore machining operations.

The present invention is not restricted to the embodiments shown and described. In particular, the invention can also be used in tools different from ball race milling cutters. Conceivable applications are, for instance, boring and milling tools in which a cutting head has to be coupled to a holder at the end face thereof and in which high flexural rigidity has to be ensured in order to be able to achieve the required machining accuracy.

The number, configuration and arrangement of the cutting elements on the cutting head are also in principle of no great importance for the present invention. Finally, the holder and the sleeve can also be configured differently provided the required flexural rigidity is ensured by the sleeve.

What is claimed is:
1. A tool for machining a workpiece, comprising:
a holder having a locating opening arranged at an end face of the holder,
a cutting head having a cutting head parent body made of steel and a blade carrier with at least one cutting element arranged thereon, wherein the blade carrier is brazed or welded on a workpiece-side end of the cutting head parent body, wherein the workpiece-side end of the cutting head parent body has a first diameter,
a sleeve, wherein the sleeve is made substantially of carbide, wherein the sleeve has a first end, wherein the first end of the sleeve is inserted and accurately fitted into the locating opening arranged at the end face of the holder, and
a coupler, wherein the coupler couples the holder, the cutting head, and the sleeve,
wherein the cutting head parent body comprises an extension that is arranged on a holder-side end of the cutting head, wherein the holder-side end of the cutting head is opposite the workpiece-side end of the cutting head, wherein the extension projects into a second end of the sleeve, wherein the second end of the sleeve is opposite and facing away from the first end of the sleeve, wherein the extension has a second diameter, wherein the second diameter is smaller than the first diameter of the workpiece-side end of the cutting head parent body, and
wherein the second end of the sleeve contacts the cutting head parent body at a surface of the cutting head parent body perpendicular to a longitudinal axis of the cutting head, wherein the surface of the cutting head parent body perpendicular to the longitudinal axis is arranged between the workpiece-side end of the cutting head parent body and the extension.

2. The tool as claimed in claim 1, wherein the sleeve is of tubular design and is inserted into the locating opening of the holder.

3. The tool as claimed in claim 2, wherein the coupler directly couples the cutting head to the holder, such that the sleeve is between the holder and the cutting head parent body when the cutting head is coupled to the holder.

4. The tool as claimed in claim 2, wherein the extension projects through the sleeve into the locating opening of the holder.

5. The tool as claimed in claim 2, wherein the projects into a sleeve locating opening, wherein the cutting head has a cutting head transverse bore, wherein the sleeve has a sleeve transverse bore, wherein the coupling coupler comprises a pin that engages the sleeve transverse bore and the cutting head transverse bore.

6. The tool as claimed in claim 1 wherein the coupler directly couples the cutting head to the holder, such that the sleeve is between the holder and the cutting head parent body when the cutting head is coupled to the holder.

7. The tool as claimed in claim 1, wherein the first end of the sleeve is fixedly inserted into the locating opening arranged at the end face of the holder.

8. The tool as claimed in claim 7, wherein the sleeve is shrink-fitted into the locating opening.

9. The tool as claimed in claim 1, wherein the coupler directly couples the cutting head to the sleeve.

10. The tool as claimed in claim 1, wherein the extension projects through the sleeve into the locating opening of the holder.

11. The tool as claimed in claim 10, wherein the holder has a holder transverse bore opens, at least on one side, into the locating opening of the holder, wherein the extension has a corresponding cutting head transverse bore, wherein the coupler comprises a screw that engages the cutting head transverse bore through the holder transverse bore.

12. The tool as claimed in claim 11, wherein the coupler comprises a taper screw, wherein the taper screw engages the cutting head transverse bore through the holder transverse bore.

13. The tool as claimed in claim 10, wherein the holder has at least one holder transverse bore that opens into the locating opening, wherein the extension has one or more circumferential grooves, wherein the coupler comprises at least one pin that engages in the one or more circumferential grooves through the at least one holder transverse bore.

14. The tool as claimed in claim 13, wherein the holder has two holder transverse bores that open into the locating opening, wherein the coupler comprises two pins that engage in the one or more circumferential grooves through a corresponding holder transverse bore of the two holder transverse bores.

15. The tool as claimed in claim 1, wherein the extension projects into a sleeve locating opening, wherein the cutting head has a cutting head transverse bore, wherein the sleeve has a sleeve transverse bore, wherein the coupler comprises a pin that engages the sleeve transverse bore and the cutting head transverse bore.

16. The tool as claimed in claim 15, wherein the extension comprises an extension slot at the holder-side end of the extension, wherein the extension slot is connected to the cutting head transverse bore, such that the cutting head can be slipped over the pin and fitted by rotation.

17. The tool as claimed in claim 1, wherein the cutting head has, on its holder-side end, a thread accessible at a holder-side end face, wherein the holder has a holder longitudinal bore running centrally through the holder, wherein the coupler comprises a screw that runs through the holder longitudinal bore and through the sleeve, wherein the screw is arranged in a rotationally locked manner, wherein the screw is screwed to the cutting head.

18. The tool as claimed in claim 1, wherein the tool is configured as a ball race milling tool.

19. The tool as claimed in claim 1, wherein the sleeve is symmetric with respect to the longitudinal axis of the cutting head.

* * * * *

UNITED STATES PATENT AND TRADEMARK OFFICE
CERTIFICATE OF CORRECTION

| | |
|---|---|
| PATENT NO. | : 8,534,963 B2 |
| APPLICATION NO. | : 13/015133 |
| DATED | : September 17, 2013 |
| INVENTOR(S) | : Matthias Luik |

Page 1 of 1

It is certified that error appears in the above-identified patent and that said Letters Patent is hereby corrected as shown below:

In the Claims

<u>Column 8,</u>
Line 34, "the projects" should read --the extension projects--.
Line 37, "the coupling coupler comprises" should read --the coupler comprises--.
Line 55, "bore opens," should read --bore that opens,--.

Signed and Sealed this
Third Day of June, 2014

Michelle K. Lee
*Deputy Director of the United States Patent and Trademark Office*